United States Patent
Xu et al.

(10) Patent No.: US 12,166,874 B2
(45) Date of Patent: *Dec. 10, 2024

(54) MINIMIZING TRAFFIC DROP WHEN REKEYING IN A DISTRIBUTED SECURITY GROUP

(71) Applicant: Nicira, Inc., Palo Alto, CA (US)

(72) Inventors: Gang Xu, Palo Alto, CA (US); Bin Qian, San Jose, CA (US); Ganesan Chandrashekhar, Palo Alto, CA (US); Bin Zan, Santa Clara, CA (US)

(73) Assignee: Nicira, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/358,345

(22) Filed: Jul. 25, 2023

(65) Prior Publication Data
US 2023/0388114 A1 Nov. 30, 2023

Related U.S. Application Data

(63) Continuation of application No. 15/582,383, filed on Apr. 28, 2017, now Pat. No. 11,750,381.

(51) Int. Cl.
*H04L 9/08* (2006.01)
*H04L 9/40* (2022.01)
(Continued)

(52) U.S. Cl.
CPC .......... *H04L 9/0891* (2013.01); *H04L 9/0833* (2013.01); *H04L 9/0861* (2013.01);
(Continued)

(58) Field of Classification Search
CPC ... H04L 9/0891; H04L 9/0833; H04L 9/0861; H04L 9/088; H04L 63/0435; H04L 63/065; H04L 63/068; H04L 63/0272
See application file for complete search history.

(56) References Cited

U.S. PATENT DOCUMENTS

| | | | |
|---|---|---|---|
| 7,245,724 B1 * | 7/2007 | Chesson | H04L 63/068 380/273 |
| 2010/0208898 A1 * | 8/2010 | Acar | H04L 9/0833 380/280 |

(Continued)

FOREIGN PATENT DOCUMENTS

| | | | | |
|---|---|---|---|---|
| WO | WO-2005062951 A2 * | 7/2005 | ........... | H04L 63/065 |
| WO | 2006132512 | 12/2006 | | |

OTHER PUBLICATIONS

M. Rajaram; D. Thilagavathy; N. Kanjana Devi; "Resilient Group Key Agreement Protocol with Authentication Security"; 2010 International Conference on Innovative Computing Technologies (ICICT), Year: 2010 | Conference Paper | Publisher: IEEE; pp. 1-6 (Year: 2010).*

(Continued)

*Primary Examiner* — Fatoumata Traore
*Assistant Examiner* — Courtney D Fields
(74) *Attorney, Agent, or Firm* — King Intellectual Asset Management

(57) ABSTRACT

Exemplary methods, apparatuses, and systems include a central controller receiving a request to generate a new encryption key for a security group to replace a current encryption key for the security group. The security group includes a plurality of hosts that each encrypt and decrypt communications using the current encryption key. In response to receiving the request, the central controller determines that a threshold period following generation of the current encryption key has not expired. In response to determining that the threshold period has not expired, the central controller delays execution of the request until the expiration of the threshold period. In response to the expiration of the threshold period, the central controller executes the request by generating the new encryption key, storing a (Continued)

time of creation of the new encryption key, and transmitting the new encryption key to the plurality of hosts.

20 Claims, 3 Drawing Sheets

(51) Int. Cl.
*H04L 9/12* (2006.01)
*H04L 9/32* (2006.01)

(52) U.S. Cl.
CPC .......... *H04L 9/088* (2013.01); *H04L 63/0435* (2013.01); *H04L 63/065* (2013.01); *H04L 63/068* (2013.01); *H04L 63/0272* (2013.01)

(56) References Cited

U.S. PATENT DOCUMENTS

| 2014/0215221 A1* | 7/2014 | Gauvreau | H04L 9/3247 |
| | | | 713/176 |
| 2015/0295899 A1* | 10/2015 | Chen | H04L 63/061 |
| | | | 713/160 |

OTHER PUBLICATIONS

Christodorescu, Mihai; Gaddam, Sivanarayana; Mukherjee, Pratyay; Sinha, Rohit; "Amortized Threshold Symmetric-key Encryption"; CCS '21: Proceedings of the 2021 ACM SIGSAC Conference on Computer and Communications Security; Nov. 2021; pp. 2758-2779 (Year: 2021).

* cited by examiner

MINIMIZING TRAFFIC DROP WHEN REKEYING IN A DISTRIBUTED SECURITY GROUP

RELATED APPLICATIONS

The present patent application is a continuation of, and hereby claims priority under 35 U.S.C § 120 to U.S. patent application Ser. No. 15/582,383, entitled "MINIMIZING TRAFFIC DROP WHEN REKEYING IN A DISTRIBUTED SECURITY GROUP," by the same inventors, filed on 28 Apr. 2017, the contents of which are herein incorporated in their entirety by reference for all purposes.

FIELD OF THE INVENTION

The various embodiments described in this document relate to managing encryption keys in a distributed security group. In particular, embodiments relate to minimizing traffic drop through the management of the generation and distribution of new keys within the group.

BACKGROUND OF THE INVENTION

Virtualized networks and other distributed network environments protect sensitive traffic within a security group using a group encryption key. One notable example of the use of a group encryption key is Group VPN (virtual private network). The periodic generation and distribution of a new key enhances security for the group. This "rekey" event occurs automatically or in response to manual input, e.g., by a security administrator. For example, each key may have a lifetime and, upon expiration of the key's lifetime, a server automatically generates and distributes a new key.

During a rekey event, distributed nodes may each receive and begin using the new key at different times. For example, in response to a rekey event, a first node may receive and use the new key to encrypt and decrypt traffic while a second node has yet to receive the new key. This may be the result different network paths with differing delivery times, failed delivery of the new key to a node, limited key storage, and/or nodes not having exactly synchronized clocks. Given that the second node is still using the old key to encrypt traffic, the first node will be unable to use the new key to decrypt traffic encrypted with the old key and sent by the second node. In such a scenario, the first node will drop the traffic sent by the second node.

Compounding the problem, multiple rekey events may occur in a short period of time. For example, a manual rekey event may occur directly after an automatic rekey event. As another example, the key specification may be updated multiple times in a short period, causing keys to be updated according to the new specification for each update. The occurrence of multiple rekey events in a short period can cause different nodes in the group to hold different keys at various points in time. As a result, network traffic drop is likely to occur.

BRIEF DESCRIPTION OF THE DRAWINGS

The present embodiments are illustrated by way of example and not limitation in the figures of the accompanying drawings, in which like references indicate similar elements, and in which.

DETAILED DESCRIPTION

This document describes embodiments that use a grace period following a rekey event to minimize traffic drop within a security group. In particular, embodiments include a central controller restricting rekeying to occur only after the expiration of a grace period following the generation of the current key. The central controller therefore prevents multiple rekey events from occurring in a short period. Embodiments also include nodes maintaining both the current and previous keys for a grace period following the generation of the current key. Nodes can decrypt incoming traffic using either the current key or the previous key while all nodes within the security group transition from using the previous key to using the current key. Thus, the central controller and nodes minimize traffic drop that may otherwise occur because of the rekeying of the security group.

Figure 1:
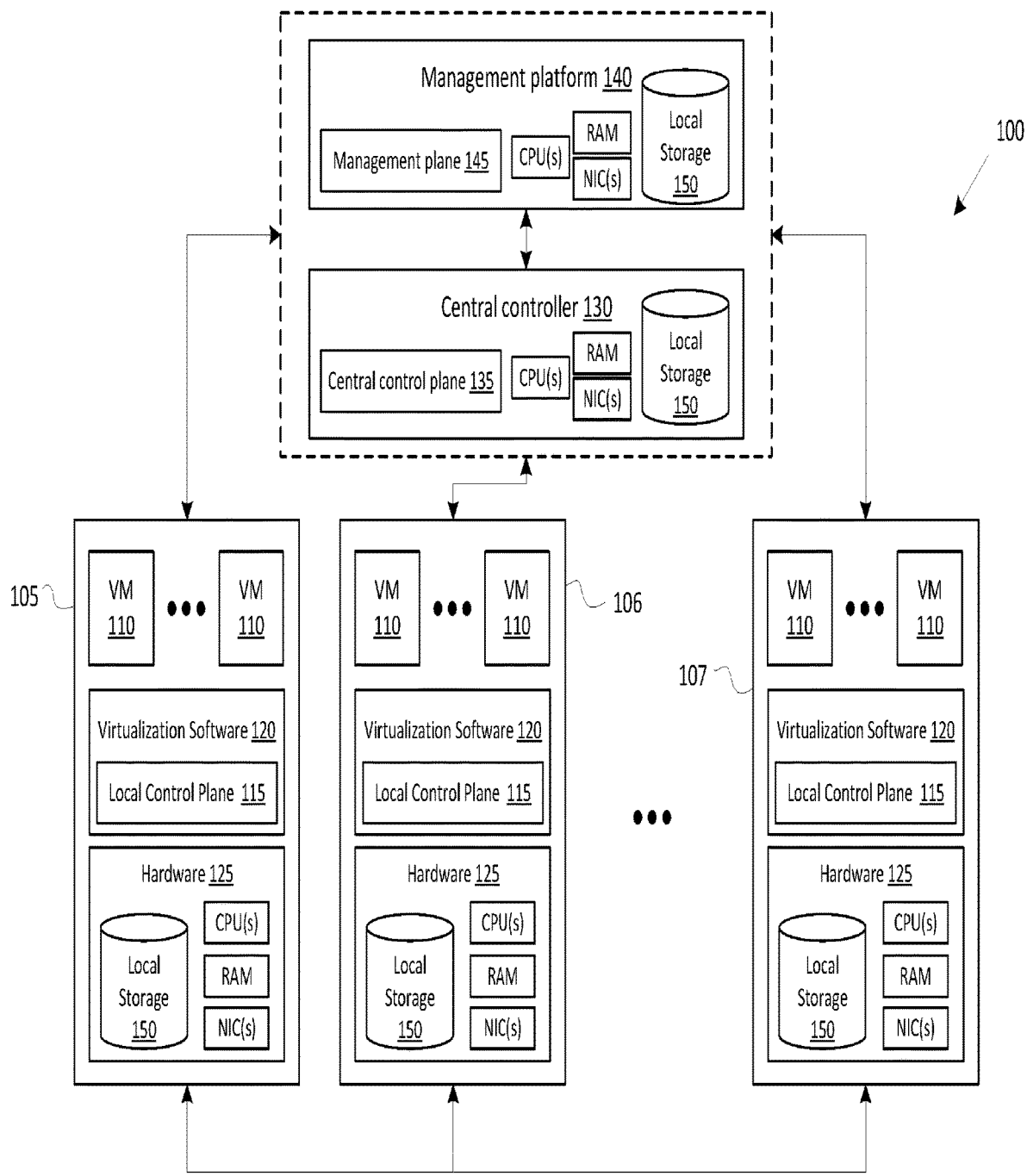
FIG. 1 illustrates, in block diagram form, a central controller and one or more nodes within a distributed security group configured to minimized traffic drop during a rekeying event for the security group.

FIG. 1 illustrates, in block diagram form, exemplary computing environment 100, including one or more networked nodes 105-107. Nodes 105-107 may also be referred to within this document as hosts, computers, and/or servers. In one embodiment, server-based computing in computing environment 100 provides centrally-managed user virtual desktops, such as those implemented by virtual machines (VMs) 110, via one or more networks (e.g., a local area network or other private or publicly accessible wide area network, such as the Internet). In one embodiment, one or more VMs 110 implement a virtualized compute, networking, storage, or security service.

Node hardware 125 includes one or more processors ("CPU(s)"), data storage and memory (e.g., "RAM"), and network interface controllers ("NIC(s)"). The data storage and memory may store data, metadata, and programs for execution by the processor(s). The data storage and memory may include one or more of volatile and non-volatile memories, such as Random Access Memory ("RAM"), Read Only Memory ("ROM"), a solid state disk ("SSD"), Flash, Phase Change Memory ("PCM"), or other types of data storage, such as magnetic disk drives, optical disk drives, etc. The memory may be internal or distributed memory.

One or more buses may interconnect the various components of hardware 125. Additionally, the network interface controllers may connect nodes 105-107, via a wired or wireless network, to central controller 130 and management platform 140 and with one another.

Virtualization software layer 120 runs on hardware 125 of host server or node (e.g., a physical computer). Virtualization software layer 120 manages VMs 110 and physical resources, such as hardware 125. Additionally, virtualization software layer 120 maintains virtual-to-physical hardware mappings. For example, virtualization software 120 may manage VM access to a processor, memory, or a network interface within hardware 125. Additionally, virtualization software 120 may manage access to virtual disks (or portions thereof) and other related files within storage 150 that may be accessed by VMs 110 residing in one or more nodes 105-107.

Central controller 130 is a distributed state management system associated with nodes 105-107. Central controller 130 is the central control point for all logical switches within a network and maintains network communication information of all VMs 110, nodes 105-107, etc. For example, central control plane 135 of central controller 130 may distribute shared encryption keys to each local control plane 115 of nodes 105-107. Each of nodes 105-107 uses the shared encryption key to encrypt and decrypt communications between nodes 105-107. In one embodiment, central controller 130 includes local storage 150, CPU(s), RAM, and NIC(s) similar to hardware 125 described with reference to nodes 105-107. For example, central controller 130 communicates with one or more of nodes 105-107 and management platform 140 via a network connection using NIC(s) within central controller 130.

Management platform 140 is also associated with nodes 105-107. Management platform 140 is a management console for manual and automated monitoring and control of nodes 105-107, VMs 110, and hardware 125. For example, management platform 140 may provision, configure, and maintain VMs 110 as virtual desktops or network services, manage pools of computer resources to run VMs 110, etc. In one embodiment, an administrator sets and/or defines nodes 105-107 included in a security group and defines policies for the security group using management platform 140. For example, an administrator may use management platform 140 to establish security policies requiring nodes 105-107 to encrypt communication transmitted to other nodes 105-107, the lifetime of a shared encryption key for the security group, events that trigger a rekey event for the security group, etc. Additionally, an administrator may use management platform 140 to manually trigger a rekey event for the security group. Management plane 145 of management platform 140 transmits security group information, policies, and rekey requests to central control plane 135. In one embodiment, management platform 140 includes local storage 150, CPU(s), RAM, and NIC(s) similar to hardware 125 described with reference to nodes 105-107.

Central controller 130 and management platform 140 are illustrated as separate devices with independent hardware. In one embodiment, as indicated by the broken line box around central controller 130 and management platform 140, central controller 130 and management 140 reside within a single device and share hardware resources. In one embodiment, central controller 130 or management platform 140 runs within a node, e.g., within a VM 110.

Figure 2:
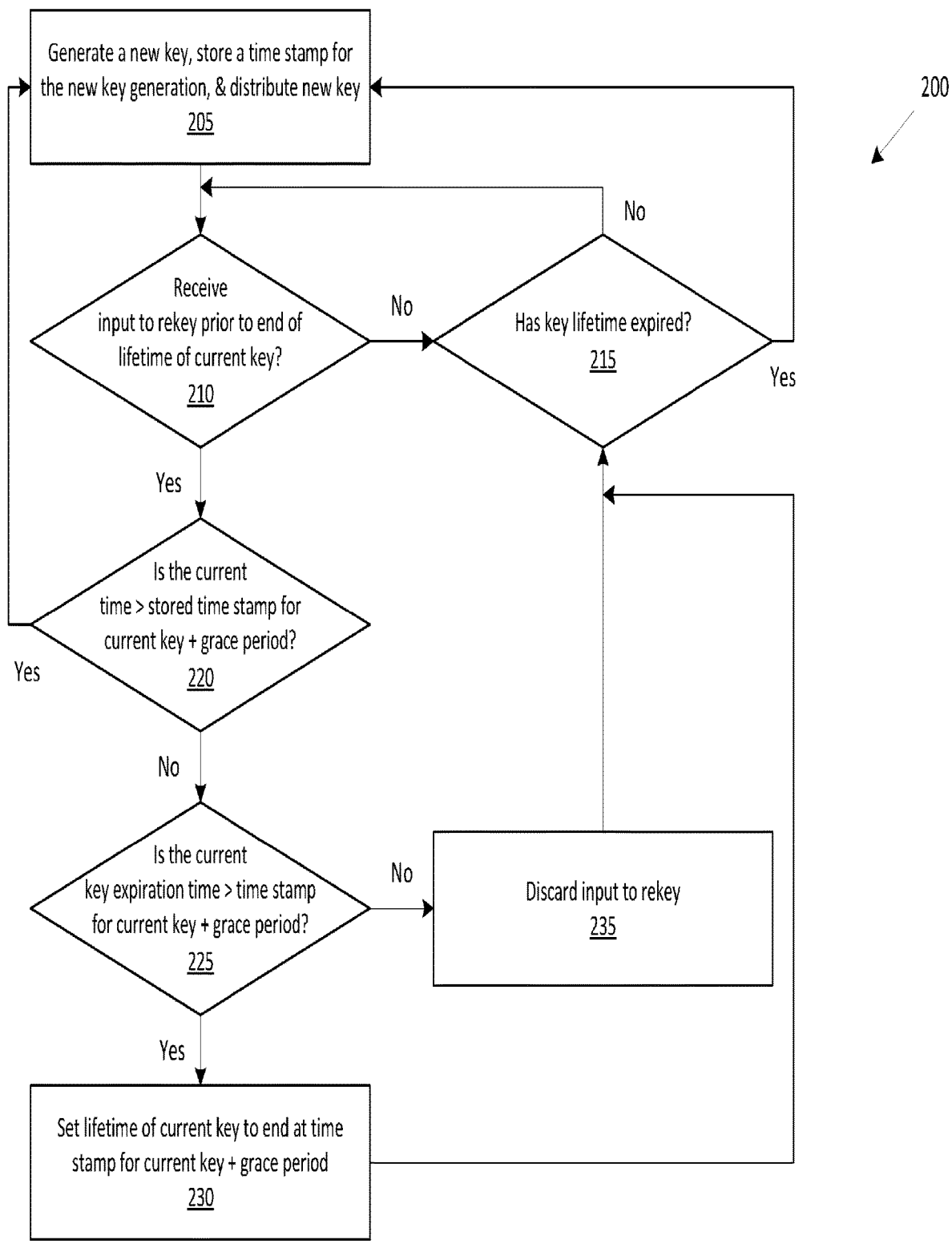
FIG. 2 is a flow chart illustrating an exemplary method of a central controller using a minimum grace period between rekeying events to minimize traffic drop for the hosts in the security group.

FIG. 2 is a flow chart illustrating exemplary method 200 of central controller 130 using a minimum grace period between rekeying events to minimize traffic drop for nodes 105-107 in a security group. For example, method 200 may be performed, at least in part, by central control plane 135.

At block 205, central controller 130 generates a new encryption key for a security group. The generation of the new key may be in response to a manual or automated request from management platform 140, creating or updating a security group, creating or updating a security policy, the expiration of the lifetime of a current key, or another rekey event. Central controller 130 stores a time stamp of the key generation, and distributes the new key to nodes 105-107 within the security group. In one embodiment, central controller 130 transmits, to each node 105-107, the time stamp along with a copy of the new key. In another embodiment, central controller 130 stores the time stamp in distributed consistent storage, e.g., using ZooKeeper or a similar service. Additionally, central controller 130 stores a time or other value specifying the lifetime of the key.

At block 210, central controller 130 determines if it has received, after generating and distributing the current key as described with reference to block 205, a request or other input to rekey the security group prior to the end of the lifetime of the current key. For example, if the current key has a lifetime of twenty four hours and a period less than twenty four hours has passed following the generation of the current key, central controller 130 would deem a request to rekey as being prior to the end of the lifetime of the current key.

If central controller 130 has not received such a rekey request, at block 215, central controller 130 determines if the lifetime of the current key has expired. If the lifetime has not yet expired, method 200 returns to block 210. If the lifetime has expired, method 200 returns to block 205 to generate and distribute a new key and replace the time stamp of the current key with a time stamp for the new key.

If central controller 130 has received a rekey request prior to the end of the lifetime of the current key, at block 220, central controller 130 determines if it received the rekey request during or after a grace period for the current key. For example, if the grace period is ten minutes and a period less than ten minutes has passed following the generation of the current key, central controller 130 would deem a request to rekey as being prior to the end of the grace period for the current key.

In one embodiment, the grace period is a default or manually-configured value. For example, an administrator may use management platform 140 to instruct central controller 130 to use a grace period of 10 minutes or another amount of time. Alternatively, central controller 130 sets the grace period based upon measured latency of traffic within the security group. For example, central controller 130 may sample the latency for communications between central controller 130 and each node within the security group. Using the measured latency, central controller 130 sets the grace period to the difference between the smallest latency between central controller 130 and a node and the largest latency between central controller 130 and a node.

If central controller 130 determines it received the rekey request at a time after the grace period following the stored time stamp for the current key, method 200 returns to block 205 to generate and distribute a new key and replace the time stamp of the current key with a time stamp for the new key. In one embodiment, central controller 130 deletes or updates the automatic scheduler set to rekey at the expiration of the lifetime of the current key. Deleting or updating the automatic scheduler starts the rekeying process.

If central controller 130 determines the rekey request is during the grace period for the current key, at block 225, central controller 130 determines if the lifetime for the current key expires at or after the end of the grace period. If the lifetime for the current key expires after the end of the grace period, at block 230, central controller 130 updates the lifetime of the current key to expire at the end of the grace period and method 200 returns to block 215. If the lifetime for the current key expires at the end of the grace period, at block 235, central controller 130 discards the rekey request as a redundant request within the grace period and method 200 returns to block 215.

Figure 3:
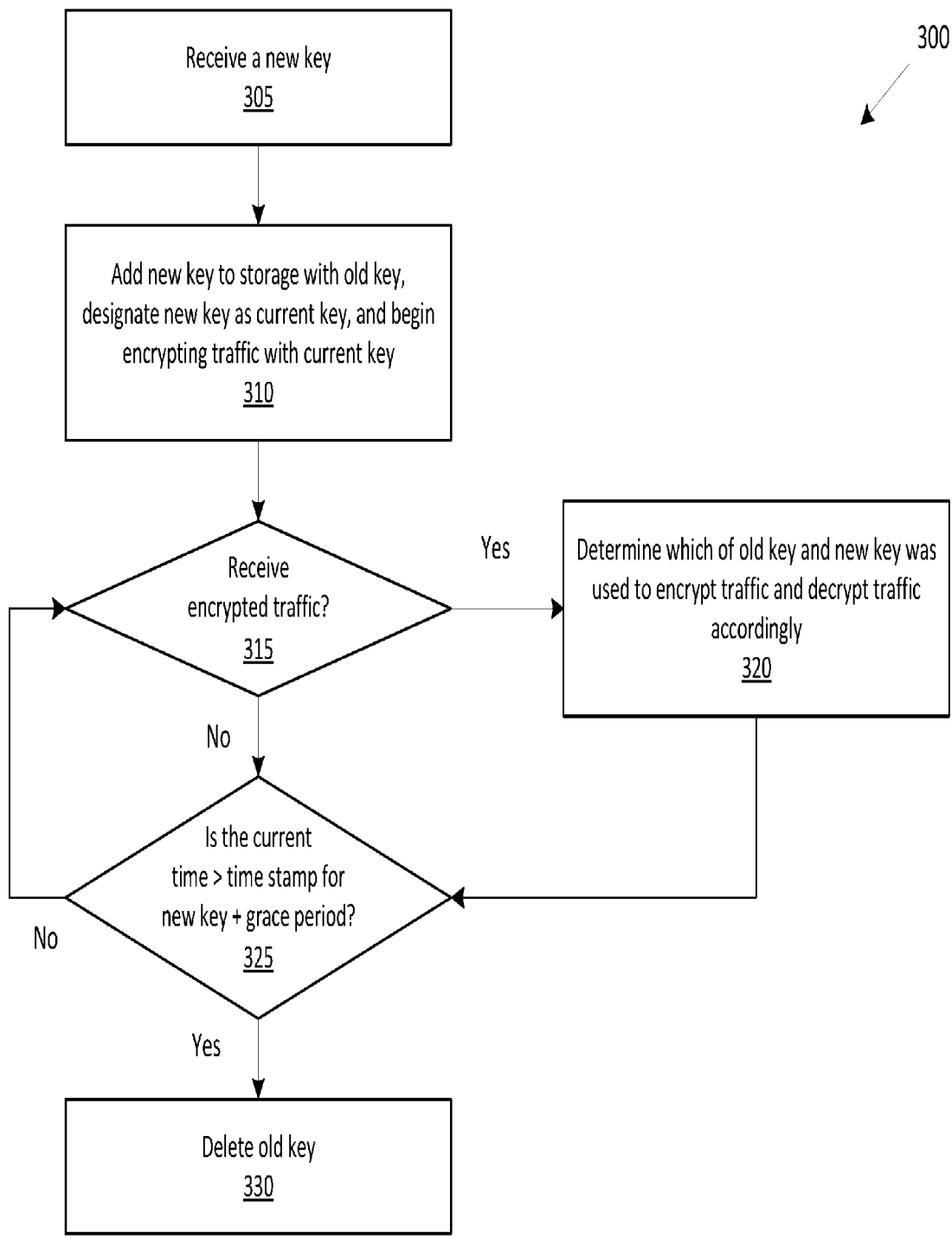
FIG. 3 is a flow chart illustrating an exemplary method of a host in the security group using a minimum grace period following a rekeying event to maintain a replaced encryption key to minimize traffic drop for the hosts in the security group.

FIG. 3 is a flow chart illustrating exemplary method 300 of a node in the security group using a minimum grace period following a rekeying event to maintain a replaced encryption key to minimize traffic drop. In one embodiment, nodes 105-107 use the same amount of time for a grace period as central controller 130. For example, central control plane 135 stores the grace period value in distributed consistent storage or otherwise distributes the grace period value to local control plane 115 of nodes 105-107. Alternatively, nodes 105-107 use a grace period of a different value. For example, local control plane 115 of nodes 105-107 may use a grace period that is longer than the grace period used by central control plane 135.

At block 305, local control plane 115 receives a new key. For example, when rekeying, central plane 135 transmits an encryption key for the security group to local control plane 115.

At block 310, local control plane 115 adds the new key to memory or storage 150. Local control plane 1155 continues to store the old key and designates one or both keys to differentiate between new and old. For example, local control plane 115 may update a pointer for a current key to point to the new key. Local control plane 115 also begins encrypting outgoing traffic transmitted within the security group with the new key.

At block 315, local control plane 115 determines if the node has received any encrypted traffic from the security group. If local control plane 115 determines that the node has received encrypted traffic from the security group, at block 320, local control plane 115 determines which of the stored keys to use to decrypt the received traffic. For example, the received traffic may include an identifier, like a Security Parameter Index (SPI) for Internet Protocol Security (IPsec) or similar tag or identifier, to enable local control plan 115 to determine which key the sending node used to encrypt the traffic. Upon parsing the traffic for this identifier, local control plane 115 selects the new or old key and decrypts the traffic.

If local control plane 115 determines that the node has not received encrypted traffic from the security group or upon selecting the appropriate key and decrypting the traffic, at block 325, local control plane 115 determines if the grace period has ended. For example, if the current time is later than the grace period added to the time stamp for the new key, the grace period has ended. If the grace period has not ended, method 200 returns to block 315. In one embodiment, local control plane 115 measures the grace period from the time stamp of the generation of the new key. Alternatively, the local control plane 115 measures the grace period from the time the node receives the new key.

If the grace period has ended, at block 330, local control plane 115 deletes the old key and proceeds by encrypting and decrypting only with the new key. All nodes should have had sufficient time within the grace period to receive and start using the new encryption key for the security group and the nodes can free the memory or storage space used to store the old key. In an alternate embodiment, local control plane 115 marks the old key for deletion or waits to delete the old key until the next rekeying, but otherwise proceeds by encrypting and decrypting only with the new key.

It will be apparent from this description that aspects of the inventions may be embodied, at least in part, in software. That is, computer-implemented methods 200 and 300 may be carried out in one or more computer systems or other data processing systems, such as nodes 105-107 and central controller 130, in response to its processor executing sequences of instructions contained in a memory or another non-transitory machine-readable storage medium. The software may further be transmitted or received over a network (not shown) via a network interface. In various embodiments, hardwired circuitry may be used in combination with the software instructions to implement the present embodiments. Thus, the techniques are not limited to any specific combination of hardware circuitry and software, or to any particular source for the instructions executed by a node and/or central controller. It will also be appreciated that additional components, not shown, may also be part of nodes 105-107 and/or central controller 130, and, in certain embodiments, fewer components than that shown in FIG. 1 may also be used in nodes 105-107 and/or central controller 130.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards, solid state drives (SSD), or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses distinct name spaces to isolate the containers from each other and therefore provides operating-system level segregation of the different groups of applications that operate within different containers. This segregation is akin to the VM segregation that is offered in hypervisor-virtualized environments, and thus can be viewed as a form of virtualization that isolates different groups of applications that operate in different containers. Such containers are more lightweight than VMs.

It should be recognized that while the specification refers to nodes and VMs, the examples given could be any type of DCNs, including physical hosts, VMs, non-VM containers, and hypervisor kernel network interface modules. In fact, the example networks could include combinations of different types of DCNs in some embodiments.

In the foregoing specification, the invention(s) have been described with reference to specific exemplary embodiments thereof. Various embodiments and aspects of the invention(s) are described with reference to details discussed in this document, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Additionally, as used in this document, the term "exemplary" refers to embodiments that serve as simply an example or illustration. The use of exemplary should not be construed as an indication of preferred examples. Blocks with dashed borders (e.g., large dashes, small dashes, dot-dash, dots) are used to illustrate virtualized resources or, in flow charts, optional operations that add additional features to embodiments of the invention. However, such notation should not be taken to mean that these are the only options or optional operations, and/or that blocks with solid borders are not optional in certain embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described in this document may be performed with fewer or more features/blocks or the features/blocks may be performed in differing orders. Additionally, the methods described in this document may be repeated or performed in parallel with one another or in parallel with different instances of the same or similar methods.

We claim:

1. A computer-implemented method, comprising:
   generating a new encryption key for a security group to replace a previous encryption key for the security group, the security group including a plurality of hosts that have each encrypted and decrypted communications using the previous encryption key;
   storing a time of creation of the new encryption key;
   transmitting the new encryption key to the plurality of hosts;
   during a threshold period following the time of creation of the new encryption key:
      receiving encrypted traffic associated with security group; and
      determining whether to decrypt the encrypted traffic with the new encryption key or the previous encryption key based on an identifier associated with the encrypted traffic;
   after an expiration of the threshold period following the time of creation of the previous encryption key, using the new encryption key to decrypt all received encrypted traffic associated with the security group.

2. The computer-implemented method of claim 1, wherein the identifier associated with the encrypted traffic comprises a security parameter index (SPI) value.

3. The computer-implemented method of claim 1, further comprising, in response to the expiration of the threshold period following the time of creation of the previous encryption key, deleting the previous encryption key.

4. The computer-implemented method of claim 1, wherein the previous encryption key was configured with a lifetime, and wherein an expiration of the lifetime triggered an automatic generation of the new encryption key.

5. The computer-implemented method of claim 1, further comprising:
   determining, for each host of the plurality of hosts, an amount of time needed to transmit data to the host;
   determining a difference between a longest amount of time needed to transmit data to a given host of the plurality of hosts and a shortest amount of time needed to transmit data to a different given host of the plurality of hosts; and
   setting the threshold period to the determined difference.

6. The computer-implemented method of claim 1, wherein storing the time of creation of the new encryption key includes storing the time of creation of the new encryption key to distributed consistent storage accessible to each host of the plurality of hosts.

7. The computer-implemented method of claim 1, wherein storing the time of creation of the new encryption key is accompanied by deleting a respective time of creation of the previous encryption key.

8. A system, comprising:
   at least one memory; and
   at least one processor coupled to the at least one memory, the at least one processor and the at least one memory configured to:
      generate a new encryption key for a security group to replace a previous encryption key for the security group, the security group including a plurality of hosts that have each encrypted and decrypted communications using the previous encryption key;
      store a time of creation of the new encryption key;
      transmit the new encryption key to the plurality of hosts;
      during a threshold period following the time of creation of the new encryption key:
         receive encrypted traffic associated with security group; and
         determine whether to decrypt the encrypted traffic with the new encryption key or the previous encryption key based on an identifier associated with the encrypted traffic;
      after an expiration of the threshold period following the time of creation of the previous encryption key, use the new encryption key to decrypt all received encrypted traffic associated with the security group.

9. The system of claim 8, wherein the identifier associated with the encrypted traffic comprises a security parameter index (SPI) value.

10. The system of claim 8, wherein the at least one processor and the at least one memory are further configured to, in response to the expiration of the threshold period following the time of creation of the previous encryption key, delete the previous encryption key.

11. The system of claim 8, wherein the previous encryption key was configured with a lifetime, and wherein an expiration of the lifetime triggered an automatic generation of the new encryption key.

12. The system of claim 8, wherein the at least one processor and the at least one memory are further configured to:
   determine, for each host of the plurality of hosts, an amount of time needed to transmit data to the host;
   determine a difference between a longest amount of time needed to transmit data to a given host of the plurality of hosts and a shortest amount of time needed to transmit data to a different given host of the plurality of hosts; and set the threshold period to the determined difference.

13. The system of claim 8, wherein storing the time of creation of the new encryption key includes storing the time of creation of the new encryption key to distributed consistent storage accessible to each host of the plurality of hosts.

14. The system of claim 8, wherein storing the time of creation of the new encryption key is accompanied by deleting a respective time of creation of the previous encryption key.

15. A non-transitory computer-readable medium storing instructions that, when executed by one or more processors, cause the one or more processors to:
generate a new encryption key for a security group to replace a previous encryption key for the security group, the security group including a plurality of hosts that have each encrypted and decrypted communications using the previous encryption key;
store a time of creation of the new encryption key;
transmit the new encryption key to the plurality of hosts;
during a threshold period following the time of creation of the new encryption key:
receive encrypted traffic associated with security group; and
determine whether to decrypt the encrypted traffic with the new encryption key or the previous encryption key based on an identifier associated with the encrypted traffic;
after an expiration of the threshold period following the time of creation of the previous encryption key, use the new encryption key to decrypt all received encrypted traffic associated with the security group.

16. The non-transitory computer-readable medium of claim 15, wherein the identifier associated with the encrypted traffic comprises a security parameter index (SPI) value.

17. The non-transitory computer-readable medium of claim 15, wherein the instructions, when executed by the one or more processors, further cause the one or more processors to, in response to the expiration of the threshold period following the time of creation of the previous encryption key, delete the previous encryption key.

18. The non-transitory computer-readable medium of claim 15, wherein the previous encryption key was configured with a lifetime, and wherein an expiration of the lifetime triggered an automatic generation of the new encryption key.

19. The non-transitory computer-readable medium of claim 15, wherein the instructions, when executed by the one or more processors, further cause the one or more processors to:
determine, for each host of the plurality of hosts, an amount of time needed to transmit data to the host;
determine a difference between a longest amount of time needed to transmit data to a given host of the plurality of hosts and a shortest amount of time needed to transmit data to a different given host of the plurality of hosts; and
set the threshold period to the determined difference.

20. The non-transitory computer-readable medium of claim 15, wherein storing the time of creation of the new encryption key includes storing the time of creation of the new encryption key to distributed consistent storage accessible to each host of the plurality of hosts.

* * * * *